United States Patent
Watanabe et al.

(10) Patent No.: US 6,661,783 B1
(45) Date of Patent: Dec. 9, 2003

(54) CDMA TRANSMISSION APPARATUS

(75) Inventors: Masatoshi Watanabe, Yokohama (JP); Masaki Hayashi, Yokosuka (JP); Osamu Kato, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/264,856

(22) Filed: Mar. 9, 1999

(30) Foreign Application Priority Data

Mar. 10, 1998 (JP) ........................................... 10-078316

(51) Int. Cl.[7] ................................................. H04J 13/00
(52) U.S. Cl. ...................................... 370/335; 370/342
(58) Field of Search ............................... 370/320, 335, 370/342, 441, 474, 208, 209

(56) References Cited

U.S. PATENT DOCUMENTS

| | | |
|---|---|---|
| 5,056,109 A | 10/1991 | Gilhousen et al. |
| 5,257,283 A | 10/1993 | Gilhousen et al. |
| 5,265,119 A | 11/1993 | Gilhousen et al. |
| 5,692,015 A | 11/1997 | Higashi et al. |
| 5,719,898 A | 2/1998 | Davidovici et al. |
| 5,963,548 A * | 10/1999 | Virtanen ...................... 370/335 |
| 6,031,827 A * | 2/2000 | Rikkinen et al. ........... 370/330 |
| 6,377,817 B1 * | 4/2002 | Hakaste et al. .............. 455/553 |

FOREIGN PATENT DOCUMENTS

JP           4-502841           5/1992

* cited by examiner

*Primary Examiner*—Kenneth Vanderpuye
(74) *Attorney, Agent, or Firm*—Greenblum & Bernstein, P.L.C.

(57) ABSTRACT

During asymmetric communications using only the uplink, frame configuration section 109 transmits a signal made up of only pilot signals and transmission power control bits assembled into frames. The transmission power control method is the same as that for normal communications. In this case, since signals transmitted on the downlink are only pilot signals and transmission power control bits, it is possible to reduce the transmission rate considerably and transmit signals with its transmission power reduced by transmission signal amplitude control section 111. In this case, a long hierarchic orthogonal type spreading code is set as the spreading code used by spreader 110.

10 Claims, 8 Drawing Sheets

CDMA TRANSMISSION APPARATUS

BACKGROUND OF THE INVENTION

1. Field of the Invention

The present invention relates to CDMA transmission apparatuses used for cellular systems such as digital car telephones and portable telephones.

2. Description of the Related Art

A CDMA (Code Division Multiple Access) system is one of the multiple access system technologies used when a plurality of stations in radio communications such as car-telephones and portable telephones carry out communications on a same frequency band simultaneously. As other technologies, an FDMA (Frequency Division Multiple Access) system, TDMA (Time Division Multiple Access) system, etc. are known. The CDMA system is a system that achieves higher frequency utilization efficiency, capable of accommodating more users than the other technologies.

The CDMA system implements multiple accesses through spread spectrum communications in which an information signal is transmitted with its spectrum spread over a sufficiently wide band relative to the original information bandwidth. One of the CDMA systems is a direct sequence system in which a spreading code is directly carried on the information signal during spreading. In this direct sequence system, signals from multiple mobile stations are multiplexed on a same frequency area and same time zone.

The CDMA system using direct sequence, if a transmitting station which desires communication is located far and another transmitting station which does not desire communication (interfering station) is near, has a so-called "near-far" problem that the reception power of a received signal from the interfering station is greater than that from the transmitting station which desires communication, preventing the stations using only processing gain (spreading gain) from suppressing correlation between spreading codes, which disables communications. For a cellular system using the direct sequence CDMA system, it is therefore indispensable to control transmission power according to the state of each transmission path on the uplinks from mobile stations to a base station.

Furthermore, as a countermeasure for fading which is the cause of deterioration of the line quality in terrestrial mobile communications, a method for compensating variations of instantaneous values of reception power by controlling transmission power is proposed.

Unexamined Japanese Patent Publication No4-502841 includes an example of transmission power control method for a cellular system using a direct sequence CDMA system. FIG. 1 illustrates the configuration to implement the transmission power control method. This cellular system consists of a base station apparatus and mobile station apparatuses and communications are normally carried out between a plurality of mobile station apparatuses and one base station apparatus.

For example, the base station apparatus receives a multiplexed signal from a plurality of mobile stations through antenna 1 and outputs it to analog receiver 2. Analog receiver 2 carries out processing such as amplification and frequency conversion of the received signal and the processed signal is supplied to digital receiver 3 for mobile stations.

Digital receiver 3 separates a signal of a specific mobile station from the multiplexed received signal by performing correlation detection using a spreading code used on the mobile station side and outputs it to baseband processing circuit 4 and reception level detection circuit 6. Baseband processing circuit 4 obtains the reception data from the separated, signal. On the other hand, it outputs the transmission data to the above mobile station to modulator 5 as a transmission signal.

Reception level detection circuit 6 measures the level of the signal received from the above mobile station, generates a power control bit according to the measured level and outputs it to modulator 5. This power control bit is used to control the transmission power of the above mobile station.

Modulator 5 multiplies the transmission signal from baseband processing circuit 4 and power control bit from reception level detection circuit 6 by a spreading code assigned to the above mobile station and outputs the result to adder 7. Adder 7 multiplexes spread signals for a plurality of mobile stations from the modulator. The multiplexed signal is subjected to processing such as conversion to RF frequency and amplification, then transmitted from antenna 1.

The mobile station apparatus receives a signal from the base station through antenna 8 and outputs it to analog receiver 9. Analog receiver 9 carries out processing such as amplification and frequency conversion on the received signal and outputs the processed signal to digital receiver 10. Furthermore, analog receiver 9 is provided with an overall power level measuring circuit for the received signal and the measured power level is input to transmission level control circuit 13.

Digital receiver 10 separates a signal directed to itself from the spread and multiplexed signal through correlative detection and outputs it to baseband processing circuit 11. It also extracts a power control bit from the separated signal and outputs it to transmission level control circuit 13. Baseband processing circuit 11 obtains reception data from the separated signal. At the same time, it outputs the transmission data to the base station as a transmission signal to modulator 12.

Modulator 12 spreads the transmission signal from baseband processing circuit 11 by multiplying it by the assigned spreading code and outputs the result to transmission level control circuit 13. Transmission level control circuit 13 controls the transmission power of the spread signal using the overall power level from analog receiver 9 and the power control bit extracted from the received signal. The output signal of transmission level control circuit 13 is subjected to processing such as conversion to RF frequency and amplification, then transmitted from antenna 8.

The transmission power control method in the cellular system configured as shown above controls the transmission power level using the overall power level measured by analog receiver 2 of the mobile station apparatus. This compensates variations of the central value of the reception level of the base station caused by the varying distance between the mobile station and base station as the mobile station moves. This method is called a "transmission power control method based on an open loop."

Furthermore, if the level of the signal received from the above mobile station measured by reception level detection circuit 6 of the base station apparatus is lower than a predetermined reference level, the power control bit is determined so that the transmission level of the mobile station may be raised, and to the contrary if it is higher than the reference level, the power control bit is determined so that the level of the mobile station may be lowered, and these power control bits are transmitted to the mobile station.

The mobile station controls the transmission level using the power control bit extracted by digital receiver 10 and carries out compensation for variations of instantaneous values due to fading which is different for the uplink (mobile station → base station) and downlink (base station → mobile station). This method is called a "transmission power control method based on a closed loop."

As shown above, the direct sequence CDMA system uses transmission power control methods based on an open loop and closed loop.

The CDMA system uses codes with high orthogonality as spreading codes to suppress interference between spreading codes. This allows the capacity of the system to be expanded. In Walsh codes and orthogonal Gold codes known as codes with high orthogonality, the number of mutually orthogonal codes is limited to the same number of code length. Therefore, in order to secure the number of spreading codes assigned to the user, a method of combining short codes which have the same cycle as the length of the information symbol and long codes which have longer cycle than that of short codes is adopted.

In this case, such a method is adopted that one long code is assigned to each base station on the downlink, with long codes varying from one base station to another. This allows the orthogonality to be maintained for all users in a same cell. Furthermore, signals from other cells are spread with different long codes and converted to noise, making it possible to suppress interference to a low level. In that case, in order to maintain the orthogonality the number of users is limited to no greater than the code length on the downlink.

On the other hand, on the uplink, since the distance between a mobile station and the base station varies among a plurality of mobile stations and spreading code timing of the received signal in the base station differs from one mobile station to another, it is not possible to maintain the orthogonality of codes. Therefore, the number of users cannot be limited by the code length on the uplink.

Hierarchic type orthogonal codes such as Walsh codes are generated by combining generation matrices hierarchically as shown in FIG. 2, characterized by any two spreading codes in any hierarchy being mutually orthogonal. For example, C10 to C13 are mutually orthogonal, and C20 to C27 are mutually orthogonal. Furthermore, both C20 and C24 consist of elements of C10 and elements with their codes inverted, and thus C20 and C24 are orthogonal to C11 to C13 excluding C10.

In voice communications such as portable telephones, a same communication information rate is used for the uplink and downlink, but when performing multi-med a services in a cellular system such as data communications, the information rate can be asymmetric between the uplink and downlink. Here, communications whose information rate is asymmetric between the uplink and downlink, for example when information is only sent from the mobile station side are called "asymmetric communications" and communications whose information rate is almost identical between the uplink and downlink are called "symmetric communications."

Now suppose a service which carries out information transmission only for the uplink and carries out no transmission for the downlink. Performing closed-loop transmission power control requires securing a spreading code to send a transmission power control bit for the downlink on which no information is transmitted.

In this case, since the spreading code resources of the downlink for closed-loop transmission power control are exhausted, when accommodating services of only downlink signals is attempted a problem occurs that accommodating those services fails because of a shortage of spreading codes even if there is no problem in terms of the system capacity. Furthermore, trying to secure downlink spreading codes assuming that no transmission power control bits are transmitted means not performing transmission power control, which will deteriorate the quality of the uplink and deteriorate the system capacity of the uplink.

SUMMARY OF THE INVENTION

It is an objective of the present invention to provide a CDMA communication apparatus in the CDMA cellular system that, even in asymmetric communications with only the uplink, for example, can avoid a shortage of spreading codes on the downlink while carrying out open-loop transmission power control on the uplink.

This objective is achieved during asymmetric communications through the use of a CDMA communication apparatus comprising a frame assembly section for assembling frames with a known reference signal and transmission power bit and a transmission rate control section for setting a lower transmission rate of a transmission signal composed of the known reference signal and transmission power bit above than the transmission rate for symmetric communications.

DETAILED DESCRIPTION OF THE PREFERRED EMBODIMENT

With reference now to the attached drawings, the embodiment of the present invention is explained in detail below.

Figure 3:
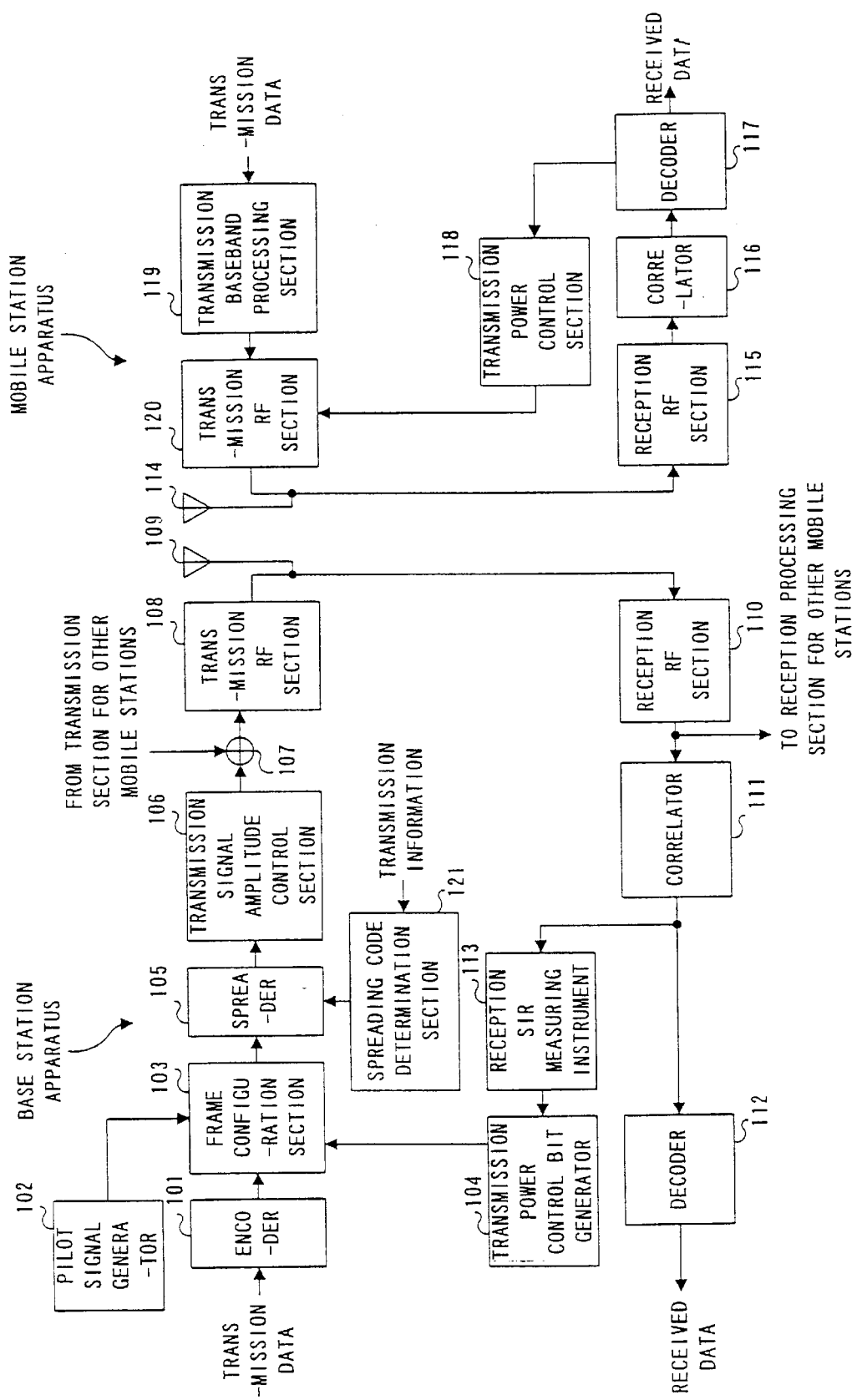
FIG. 3 is a block diagram showing the configuration of a CDMA mobile communication system according to one embodiment of the present invention.

FIG. 3 is a block diagram showing the configuration of a CDMA mobile communication system according to Embodiment 1 of the present invention. This mobile communication system consists of CDMA communication apparatuses such as a base station apparatus and mobile station apparatuses.

The base station apparatus comprises encoder 101, pilot signal generator 102, frame configuration section 103, spreader 105, spreading code determination section 121, transmission signal amplitude control section 106, addition section 107, transmission RF section 108, antenna 109, reception RF section 110, correlator 111, decoder 112, reception SIR measuring instrument 113, and transmission power control bit generator 104.

Figure 4:
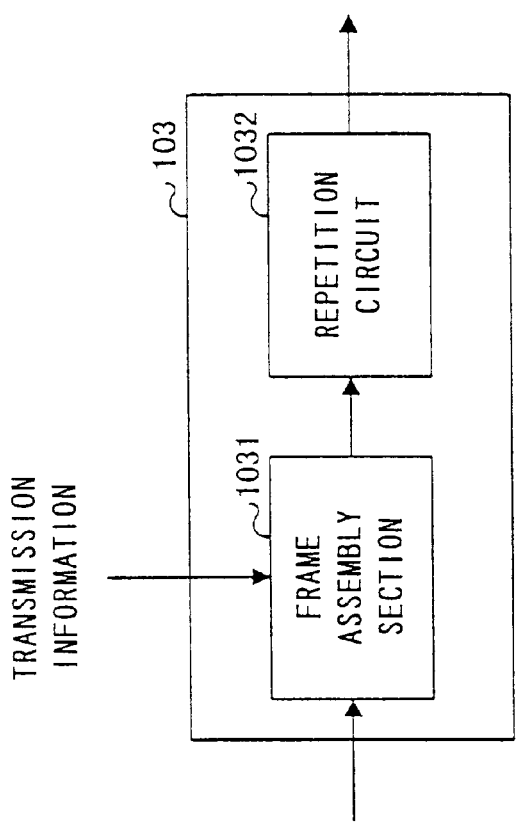
FIG. 4 is a block diagram showing the configuration of frame configuration section 103 shown in FIG. 3.

Frame configuration section 103 in the base station apparatus, as shown in FIG. 4, comprises frame assembly section 1031 that assembles encoded data into frames and repetition circuit 1032 that performs repetition processing which is processing for transmission rate control on the frame-assembled frame data during asymmetric communications.

Figure 5:
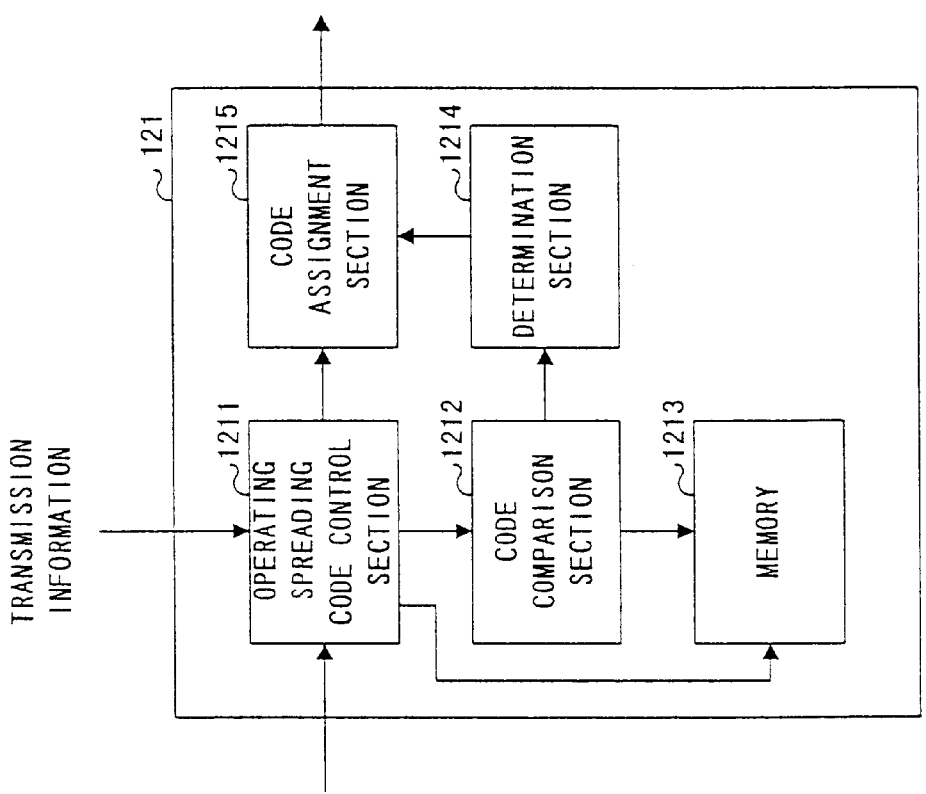
FIG. 5 is a block diagram showing the configuration of spreading code determination section 121 shown in FIG. 3.

Spreading code determination section 121 comprises, as shown in FIG. 5, operating spreading code control section 1211 that controls spreading codes used For mobile stations under its control, code comparison section 1212 that compares spreading codes stored in memory 1213 in the case of asymmetric communications, determination section 1214 that determines spreading codes available based on the comparison result and code assignment section 1215 that assigns spreading codes to a specific downlink based on information on the spreading codes in use and the determination result as necessary. Memory 1213 stores hierarchic orthogonal type spreading codes such as Walsh codes.

The mobile station apparatus comprises antenna 114, reception RF section 115, correlator 116, decoder 117, transmission power control section 118, transmission RF section 120 and transmission baseband processing section 119.

In the base station apparatus of the mobile communication system configured as shown above, transmission data for a mobile station are input to encoder 101, subjected to encoding processing, etc. and output to frame configuration section 103. Furthermore, pilot signal generator 102 generates a pilot signal whose data pattern is fixed (known reference signal, pilot symbol for example) and outputs it to frame configuration section 103.

In frame configuration section 103, the output of encoder 101, the pilot signal from pilot signal generator 102 and the transmission power control bit from transmission power control bit generator 104 are input and they are assembled into a frame. That is, the above signals are assembled into frame data in frame assembly section 1031 of frame configuration section 103.

At this time, in the case of asymmetric communications, frame configuration section 103 sets a low transmission rate through repetition processing by repetition circuit 1032 based on transmission information indicating asymmetric communications and configures a frame with only a pilot signal and transmission power control bit.

The frame-configured data are output to spreader 105. Spreader 105 uses a spreading code determined by spreading code determination section 121 to perform spreading processing on the frame-configured data and outputs the spread signal to transmission signal amplitude control section 106.

Here, spreading code determination section 121 inputs transmission information as to whether the communication is symmetric or asymmetric to operating spreading code control section 1211. If the transmission information indicates that the communication is symmetric, operating spreading code control section 1211 extracts an unused spreading code with reference to memory 1213 according to the operating situation of the spreading codes and outputs it to code assignment section 1215. Code assignment section 1215 assigns the spreading code input to a specific downlink.

If the transmission information indicates that the communication is asymmetric, the transmission rate is controlled to a low level as will be described later, and thus operating spreading code control section 1211 extracts a spreading code included in a hierarchy of spreading codes longer than the spreading code used on the symmetric communication lines with reference to memory 1213. The extracted spreading code is sent to code comparison section 1212 where it is compared with the spreading code in use which is controlled by operating spreading code control section 1211.

Comparison here is made by examining whether the component unit of the operating spreading code is used for the spreading code extracted. The comparison result is sent to determination section 1214 which then judges whether it can be used as the spreading code for the downlink in asymmetric communication. The spreading code which determination section 1214 judges usable is sent to code assignment section 1215 where the spreading code sent is assigned to a specific downlink.

Transmission signal amplitude control section 106 controls the amplitude of the signal input and outputs the signal to adder 107. Adder 107 adds up the output of transmission signal amplitude control section 106 and signals from the transmission sections of other mobile stations and outputs the result to transmission RF section 108. Transmission RF section 108 performs modulation and frequency conversion on the input and this transmission signal is transmitted from antenna 109.

The signal received through antenna 109 from a mobile station is subjected to frequency conversion and demodulation by reception RF section 110 and output to correlator 111 and the reception processing section for other mobile stations. In correlator 111, the signal is despread with the spreading code used on the mobile station side and the desired wave signal is separated from the received signal. The separated and despread data are output to decoder 112 and reception SIR (signal to interference ratio) measuring instrument 113.

Decoder 112 decodes the input and obtains received data. Reception SIR measuring instrument 113 measures reception SIR from the received signal and the measurement result is output to transmission power control bit generator 104. Transmission power control bit generator 104 compares the reception SIR input and reference SIR and controls the reception SIR so that it can approximate to the reference SIR, that is, generates a transmission power control bit for the mobile station so as to reduce the difference between the reference SIR and reception SIR. The transmission power control bit is output to frame configuration section 103.

On the other hand, in the mobile station apparatus, the signal received through antenna 114 from the base station is output to reception RF section 115. Reception RF section 115 performs frequency conversion and demodulation on the input and outputs it to correlator 116. Correlator 116 carries out despreading using the spreading code used on the base station side and outputs the despread data to decoder 117.

Decoder 117 decodes the input and obtains received data. It also obtains a transmission power control bit and outputs this transmission power control bit to transmission power control section 118. Transmission power control section 118 uses the transmission power control bit sent from the base station to determine the transmission power and outputs it to transmission RF section 120.

On the other hand, the transmission data for the base station are subjected to transmission path encoding and spreading processing in transmission baseband processing section 119 and output to transmission RF section 120. Transmission RF section 120 carries out modulation and frequency conversion on the input and transmits this transmission signal from antenna 114.

In the CDMA mobile communication system configured as shown above, the normal transmission power control processing operation is explained first.

Figure 6:
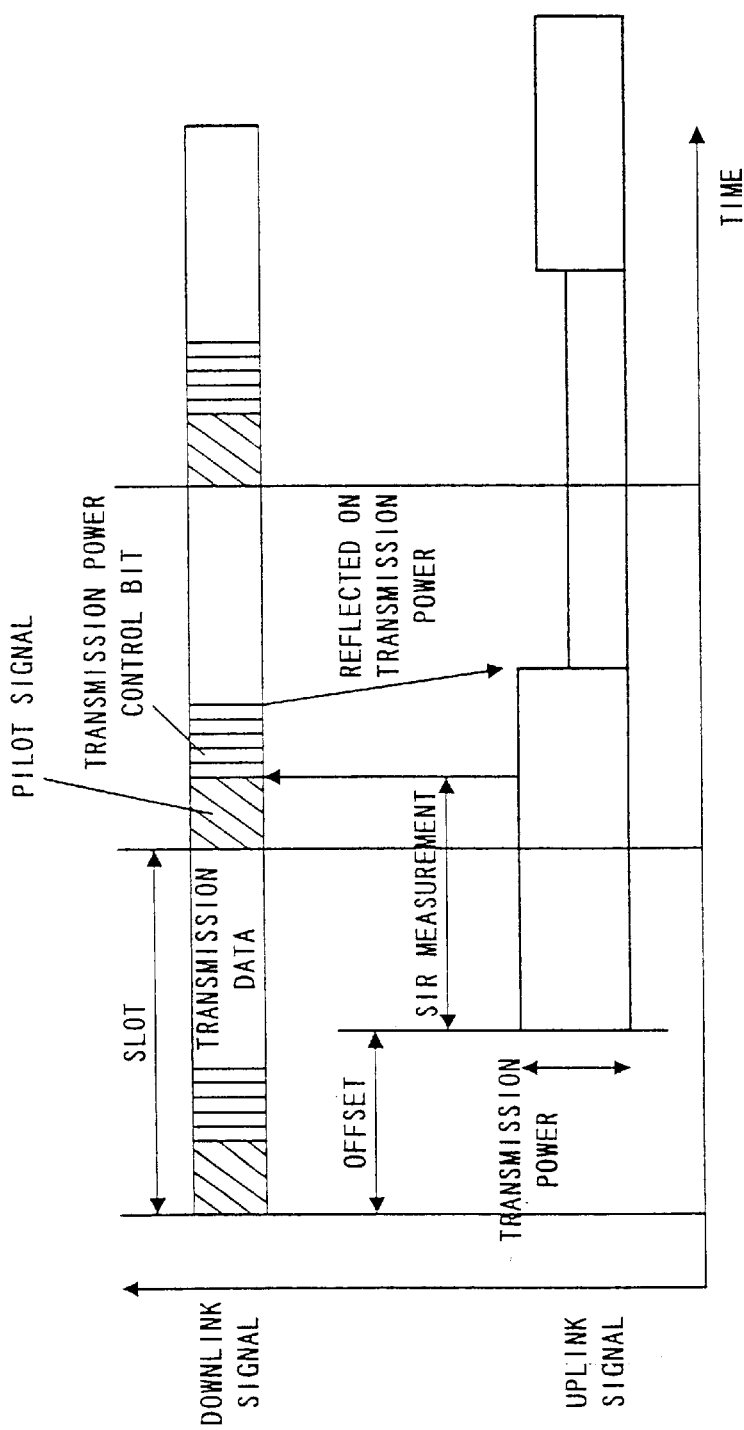
FIG. 6 is a timing chart showing the signal transmission method and transmission power control method in normal operations in the CDMA mobile communication system according to the embodiment above.

FIG. 6 is a timing chart of a signal under normal transmission power control. As seen from FIG. 6, the downlink signal is a signal made up of a pilot signal, transmission power control bit and transmission data time-multiplexed in slot units by frame configuration section 103 and it is transmitted in such a frame configuration from the base station.

The pilot signal is a signal which has a fixed information pattern and is used by the mobile station to estimate the transmission path for demodulation. The uplink signal is also transmitted as a signal slot cycles as with the downlink signal. In order to minimize a transmission power control delay in the uplink timing, an offset is provided for the downlink. The offset is set appropriately so that it may be reflected on the transmission power of the uplink.

In the base station, SIR measuring instrument 113 measures the reception SIR of the signal at the start of a slot of an uplink signal. The reception SIR represents the line quality. The measured reception SIR is sent to transmission power control bit generator 104 and is compared by transmission power control bit generator 104 with a reference SIR provided beforehand as the required quality.

If the reception SIR is lower than the reference SIR, transmission power control bit generator 104 generates a transmission power control bit as a command ordering that the transmission power of the mobile station be increased and if the reception SIR is higher than the reference SIR, it generates a transmission power control bit as a command ordering that the transmission power of the mobile station be decreased and notifies it to the mobile station with the next slot.

The mobile station extracts this transmission power control bit from the received signal and transmission power control section 118 determines the transmission power value from the transmission power control bit (command to increase/decrease the transmission power) and makes it reflect on the transmission power at the start of the next uplink slot. That is, the mobile station determines the transmission power according to commands of increasing/decreasing the transmission power from the base station and makes it reflect on the next uplink slot.

Figure 7:
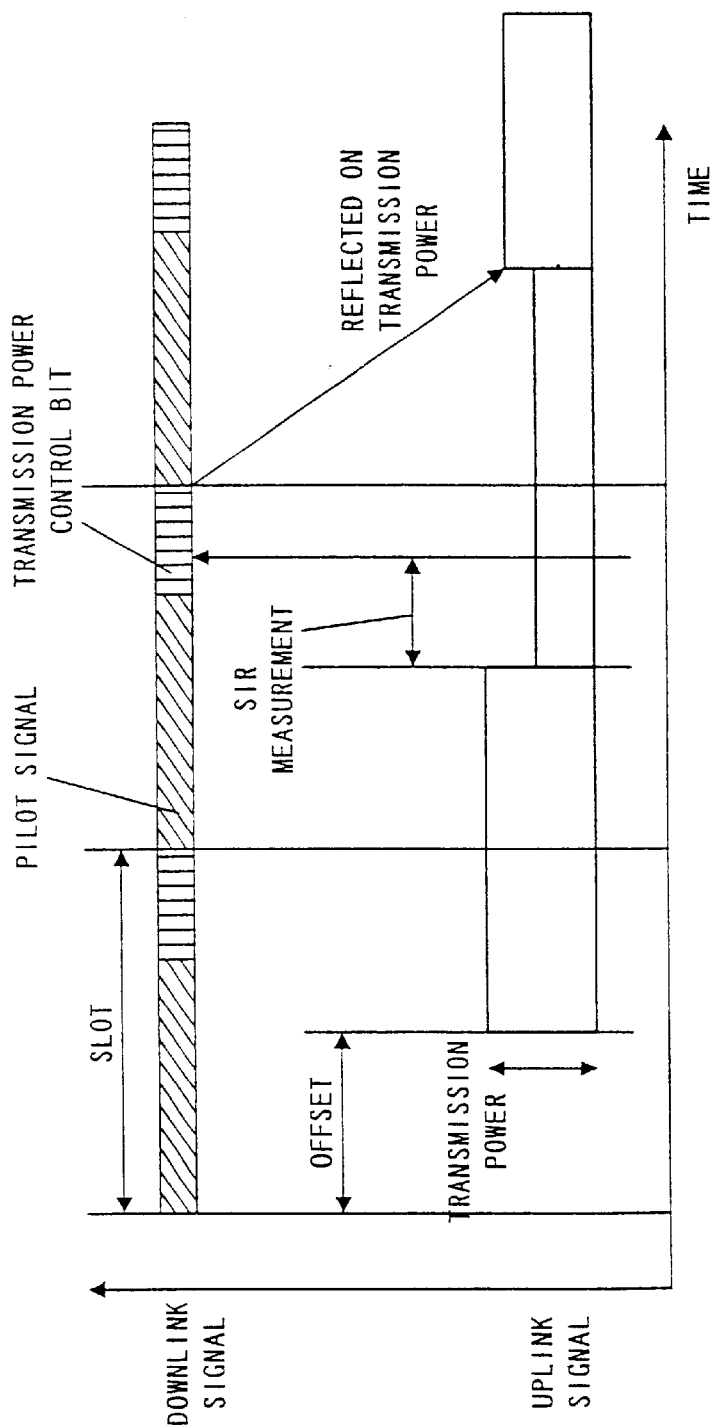
FIG. 7 is a timing chart showing an example of the signal transmission method and transmission power control method during asymmetric communications in the CDMA mobile communication system according to the embodiment above.

Then, the transmission power control method during asymmetric communication which is a communication using the uplink alone is explained with reference to FIG. 7. By the way, there are no transmission data on the downlink, and thus frame configuration section 103 transmits a signal made up of only pilot signals and transmission power control bits assembled in slot units. In this case, transmission power control is carried out in the same way as for normal communications.

In this case, the only signals transmitted on the downlink are pilot signals and transmission power control bits, and thus the carrier rate is extremely reduced. By controlling the transmission rate in this way, it is possible to send a signal with its transmission power reduced by transmission signal amplitude control section 106. Furthermore, a long hierarchic orthogonal type code is used as a spreading code used by spreader 105. Thus, signals can be transmitted with transmission power reduced, making it possible to reduce interference with other mobile stations.

Figure 1:
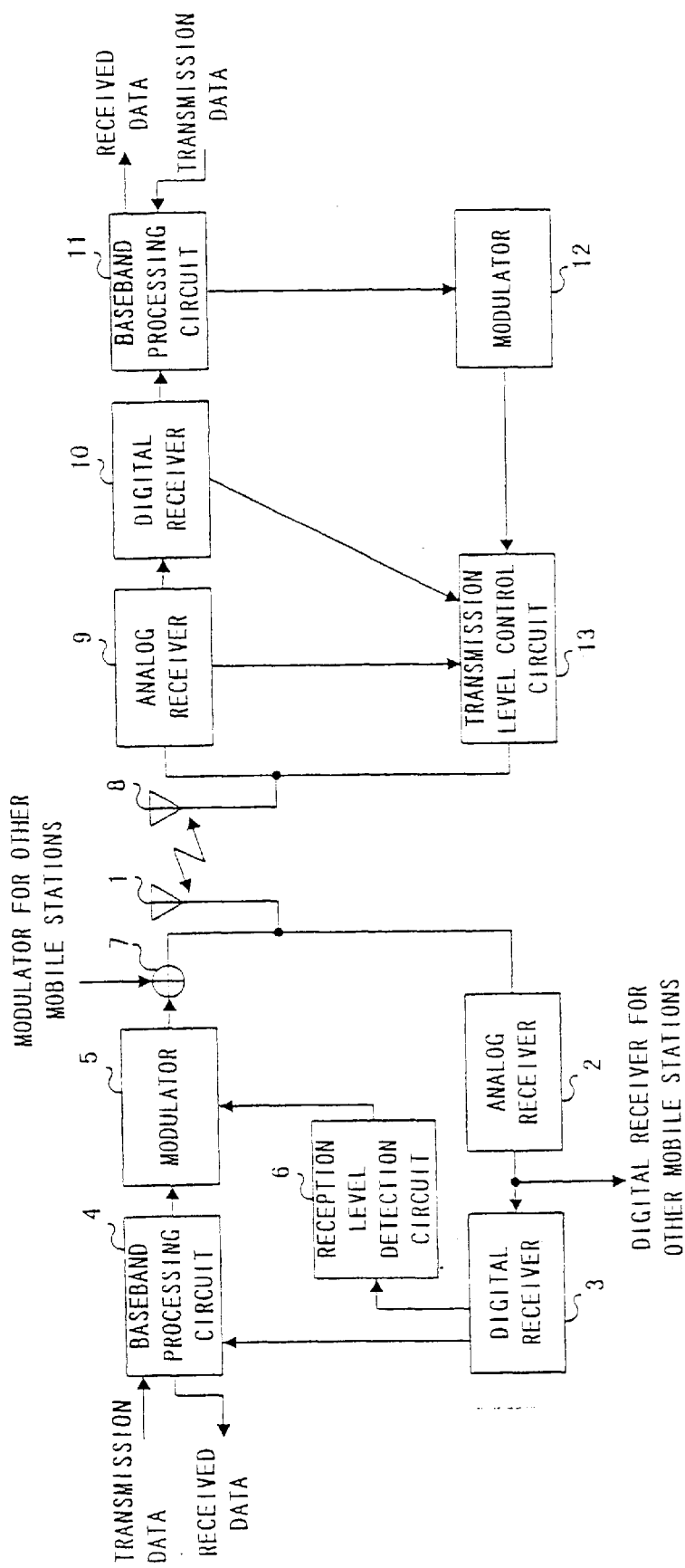
FIG. 1 is a block diagram showing the configuration of a conventional CDMA mobile communication system.
Figure 2:
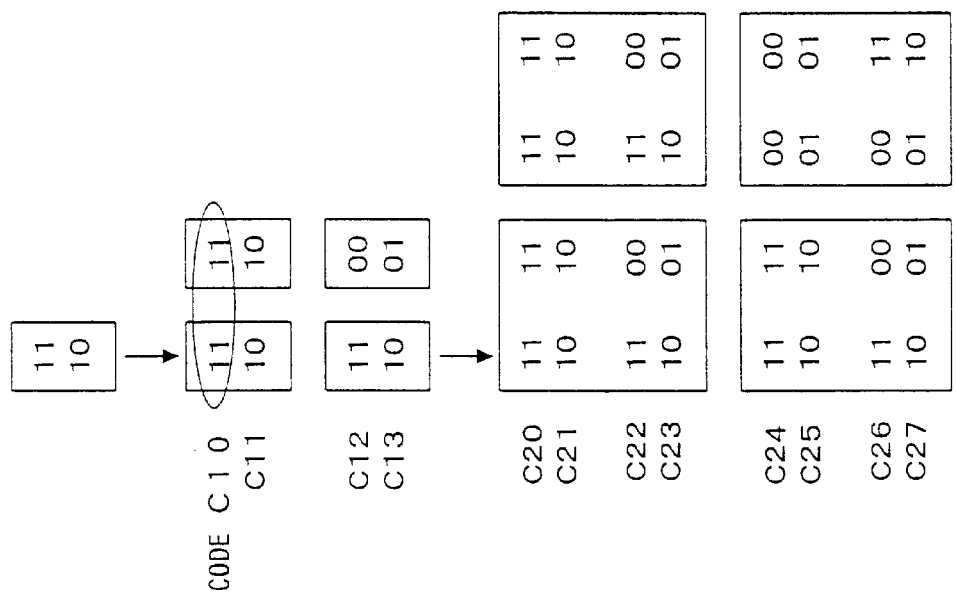
FIG. 2 is a conceptual drawing showing the generation of hierarchic orthogonal type codes.

How to determine the spreading code in this case is explained with reference to FIG. 2. Suppose that four kinds of spreading code resources C10 to C13 are used during normal uplink and downlink symmetric communications.

When carrying out asymmetric communications with only an uplink, if the transmission rate is set to ½ for example, the same spreading band is used, and therefore a spreading code twice in code length can be used as a downlink spreading code. That is, 8 kinds of spreading codes C20 to C27 can be used.

Here, if C20 is used as a spreading code for the downlink, C20 uses C10 which is a spreading code one hierarchy ahead as its element. Therefore, C20 cannot maintain orthogonality with C10 and can no longer be used as a spreading code used normally for the downlink.

If there is another user who carries out asymmetric communication with only an uplink, C24 is assigned as a spreading code for the downlink. Like C20, C24 has C10 as its element and cannot maintain orthogonality with C10.

Here, C20 and C24 are mutually orthogonal. Therefore, C20 and C24 which cannot be used as spreading codes for a normal downlink can be used as spreading codes for pilot signals and transmission power control bits. As a result, it is possible to increase the number of users without reducing the number of spreading codes used for a normal downlink.

As shown above, spreading codes which cannot be used for a normal downlink are used as spreading codes for pilot signals and transmission power control bits for asymmetric communications, making it possible to secure a lot of spreading codes while maintaining orthogonality. This makes it possible to utilize spreading code resources effectively and increase the number of users. Furthermore, it allows the transmission rate to be reduced for pilot signals and transmission power control bits, thus suppressing interference with other mobile stations.

By the way, in the CDMA mobile communication system with the above configuration, it is possible to apply closed-loop transmission power control of the base station as in the case of transmission power control of the mobile station. In this case, the quality of the transmission power control bits of the downlink can be improved.

Figure 8:
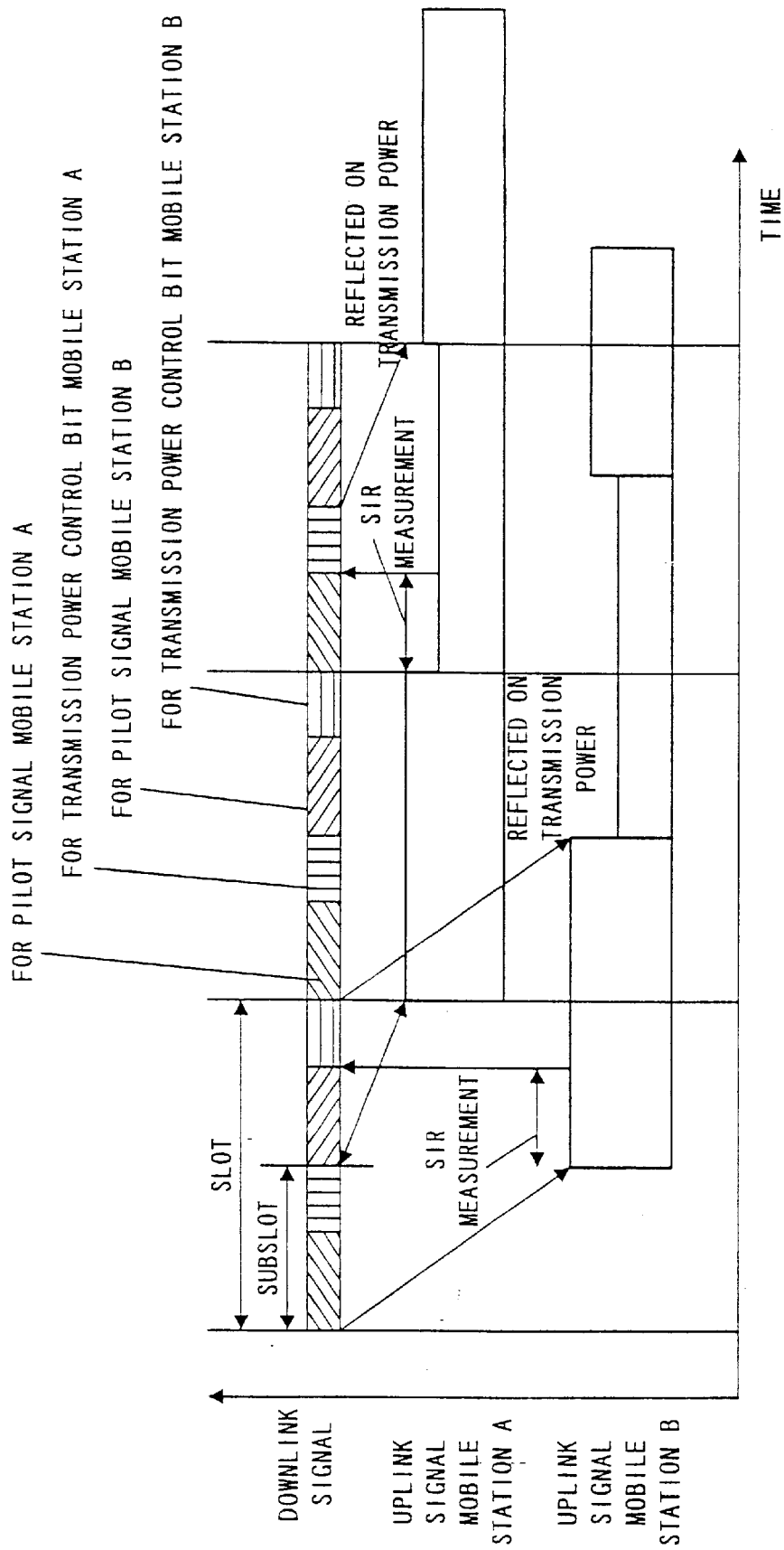
FIG. 8 is a timing chart showing another example of the signal transmission method and transmission power control method during asymmetric communications in the CDMA mobile communication system according to the embodiment above.

Furthermore, as shown in FIG. 8, the present invention can also be implemented by dividing a slot of the downlink into a plurality of subslots and using each subslot as a downlink signal for a different asymmetric communication user. In this case, spreading codes of the downlink can be used more efficiently, and thus more users can be accommodated within the system. Transmission power control of the base station can also be applied to this case.

The CDMA communication apparatus according to the present invention uses hierarchic orthogonal type spreading codes, sets low transmission rates of the downlink in asymmetric communications with the uplink alone, for example, and transmits transmission power control bits on the downlink using spreading codes of a hierarchy of long codes. In a CDMA cellular system, it is capable of performing open-loop transmission power control for the uplink during asymmetric communication with only the uplink while avoiding a shortage of spreading codes on the downlink.

This specification is based on the Japanese Patent Application NO.HEI 10-78316 filed on Mar. 10, 1998, the content of which is included herein.

What is claimed is:

1. A CDMA mobile communication system, wherein a base station apparatus, when performing asymmetric communications, transmits known reference signals and transmission power control bits at a lower transmission rate than a transmission rate when symmetric communications are performed, and a mobile station receives said transmission power control bits and determines transmission power based on said transmission power control bits;

wherein a code length of a spreading code longer than a code length of spreading codes for symmetric communications is used as the spreading code for the downlink of asymmetric communications and said longer spreading code is orthogonal to spreading codes used for other asymmetric communication lines.

2. The CDMA mobile communication system according to claim 1, wherein a hierarchic orthogonal type spreading code is used as a spreading code for a downlink, and a hierarchic orthogonal type spreading code is a spreading code of a hierarchy which contains spreading codes with a length that is longer than spreading codes used for symmetric communication downlinks, said spreading code being orthogonal to spreading codes used for other asymmetric communication lines.

3. A spreading code selection method, which selects as the spreading code for asymmetric communications, a hierarchic orthogonal type spreading code which is a spreading code of a hierarchy which contains spreading codes of a longer length than spreading codes used for symmetric communication lines and is orthogonal to spreading codes used for other asymmetric communication lines.

4. A CDMA mobile communication method, when performing asymmetric communications, comprising:

a base station apparatus spreading known reference signals and transmission power control bits by spreading codes with a length that is longer than spreading codes used for symmetric communications, and transmitting spreaded known reference signals and a spreaded transmission power control bits at a lower transmission rate than a transmission rate when symmetric communications are performed;

a mobile station apparatus receiving said transmission power control bits; and said mobile station apparatus determining transmission power based on said transmission power control bits.

5. The CDMA mobile communication method according to claim 4, wherein a hierarchic orthogonal type spreading code is used as a spreading code for a downlink and a spreading code of a hierarchy which contains spreading codes with a length longer than spreading codes used on a symmetric communication downlink is used as the spreading code for an asymmetric communication downlink, said spreading code of a hierarchy of spreading codes with a longer length being orthogonal to spreading codes used for other asymmetric communication lines.

6. A CDMA communication apparatus, comprising:

a frame assembler that assembles frames with known reference signals and transmission power bits during a communication;

a transmission rate controller that sets a lower transmission rate of a transmission signal made up of said known reference signals and said transmission power bits than a transmission rate for a symmetric communication, and a spreading code determiner that determines a spreading code for spreading the transmission signal made up of said known reference signals and said transmission power bits, the spreading code having a longer code length than a spreading code for a symmetric communication line.

7. The CDMA communication apparatus of claim 6, wherein said spreading code determiner uses a hierarchical orthogonal type spreading code as a spreading code, and determines a spreading code of a hierarchy which contains spreading codes with a length longer than spreading codes used for symmetric communication lines as a spreading code that spreads said transmission signal of said known reference signals and said transmission power bits.

8. The CDMA communication apparatus of claim 6, wherein said spreading code determiner selects a spreading code which is orthogonal to spreading codes used for other asymmetric communication lines.

9. A base station apparatus, comprising:

a CDMA communication apparatus, wherein said CDMA communication apparatus includes:

a frame assembler that assembles frames with known reference signals and transmission power bits during an asymmetric communication;

a transmission rate controller that sets a transmission rate of a transmission signal made up of said known reference signals and said transmission power bits that is lower than a transmission rate for a symmetric communication; and a spreading code determiner that determines a spreading code for spreading the transmission signal made up of said known reference signals and said transmission power bits, the spreading code having a longer code length than a spreading code for a symmetric communication line.

10. A mobile station apparatus which performs a radio communication with a base station apparatus, comprising:

a CDMA communication apparatus, having:

a frame assembler that assembles frames with known reference signals and transmission power bits during an asymmetric communication;

a transmission rate controller that sets a transmission rate of a transmission signal made up of said known reference signals and said transmission power bits that is lower than a transmission rate for a symmetric communication; and a spreading code determiner that determines a spreading code for spreading the transmission signal made up of said known reference signals and said transmission power bits, the spreading code having a longer code length than a spreading code for a symmetric communication line.

* * * * *